United States Patent Office
3,539,783
Patented Nov. 10, 1970

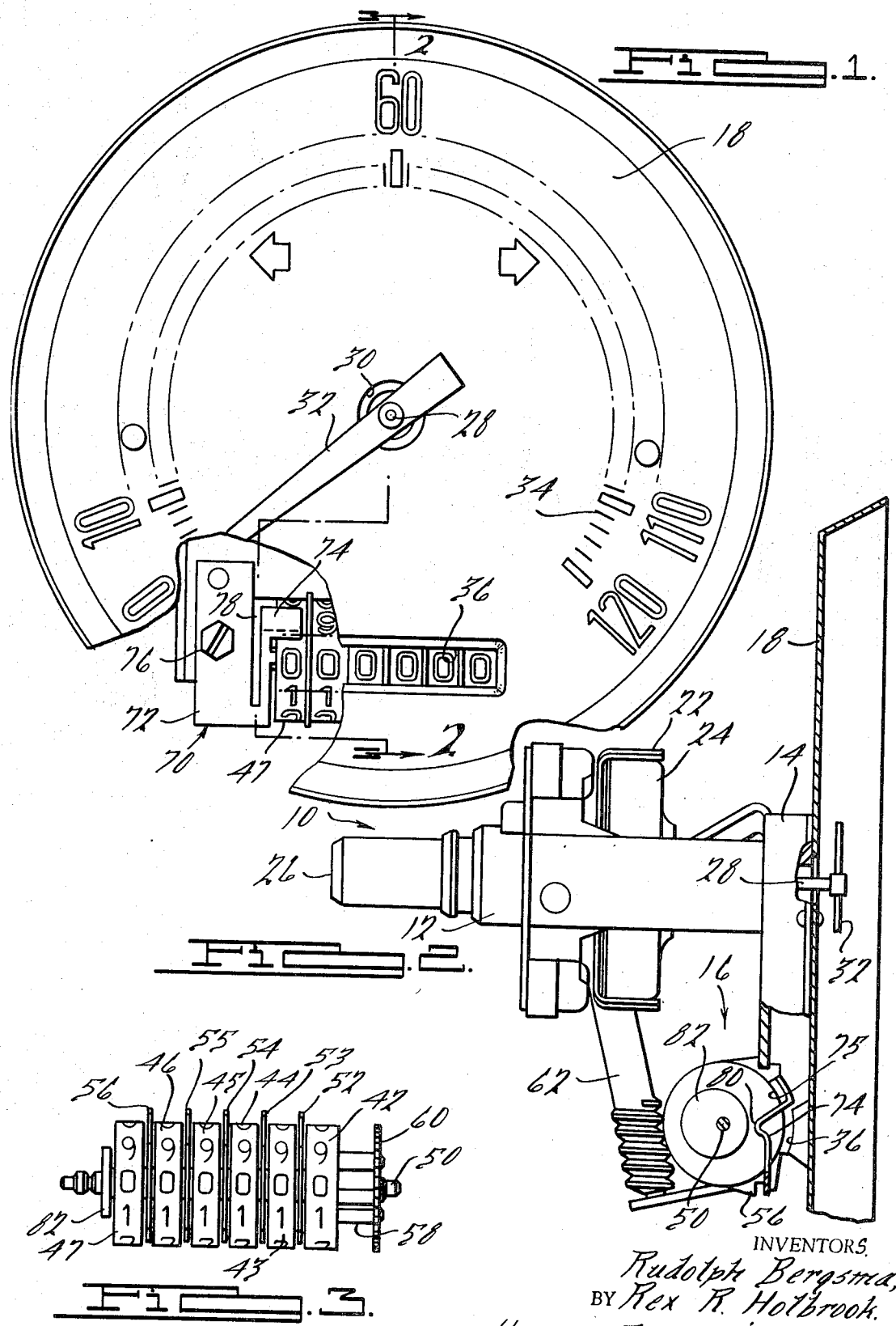

3,539,783
TAMPER-PROVING ODOMETER
Rudolph Bergsma and Rex R. Holbrook, Ann Arbor, Mich., assignors to Chrysler Corporation, Highland Park, Mich., a corporation of Delaware
Filed Mar. 26, 1969, Ser. No. 810,715
Int. Cl. G01c 22/00
U.S. Cl. 235—96       10 Claims

ABSTRACT OF THE DISCLOSURE

A tamper-proving or detecting odometer construction in which the peripheral surface of at least the highest order odometer wheel is indelibly marked or stained by a marking instrumentality as the wheel is advanced past the viewing window in which the stained portion of the wheel will appear as a tattletale signal if the odometer setting has been changed either by forward or reverse driving or picking of the wheels to reduce the actual mileage accumulated thereon and featuring means for periodically disengaging the marking instrumentality from the wheel to prevent a skewed or misaligned read out display otherwise resulting from the braking or drag effect of the marking instrumentality on the wheel or wheels being marked.

BACKGROUND OF THE INVENTION

This invention relates to registration devices as vehicle odometers and the like, and, more particularly, to a tamper-proof odometer of a type which furnishes an immediately recognizable visible indication if the setting of the odometer has been changed to reduce the actual mileage or quantity accumulated on the odometer or registering device.

The invention has for its objects to provide a tamper-proof odometer of the above character which is capable of detecting whether the setting of the odometer has been changed either by forward or reverse driving, picking or otherwise resetting the odometer wheels; which is of simple and inexpensive construction, compatible with conventional odometer drive and registering mechanisms; and which produces no interference with the operation of nor the display from the odometer while providing a positive telltale indication in the event of such tampering with the odometer mechanism.

The above and other objects and advantages together with the structural features and operation of the invention will appear more fully from the detailed description following the accompanying description of drawings wherein:

FIG. 1 is a front elevation view with parts broken away of a vehicle speedometer and odometer embodying the tamper proving detecting construction of the present invention; and FIG. 2 is a side elevation view of FIG. 1; and FIG. 3 is a front elevation view of the odometer used in the speedometer structure of FIGS. 1 and 2.

DESCRIPTION OF PREFERRED EMBODIMENTS

Referring to the drawings, the invention is shown applied to a vehicle speedometer and odometer head assembly 10 embodying details of construction illustrated and described in copending application U.S. Ser. No. 638,805 of common ownership herewith. Briefly described, the speedometer comprises a generally U-shaped frame 12 to the forward end of which is attached a bridge plate or bracket member 14, which supports the odometer assembly 16 and a speedometer dial 18 that is riveted to the plate 14. Rotatively supported in the resulting box frame and bridge assembly is a magnet and speed cup assembly of which the magnet 22 is driven in accordance with vehicle speed from a speedometer cable (not shown) detachably received in the drive input end 26 of the speedometer head. The speed cup 24 is magnetically coupled to and is angularly displaced by the rotating magnet against the increasing bias of a return spring (not shown) which is attached to the shaft 28 of the speed cup as shown in the above referenced application. The forward end of the shaft 28 extends through an opening 30 in the dial and carries a needle pointer 32 thereon to provide an indication of the thus measured vehicle speed as manifested by the displaced position of the needle pointer along a calibrated scale 34 of indicia bearing graduations of the front face of the speedometer dial.

The speedometer dial 18 has an elongated aperture 36 therein presenting a viewing window for the aforementioned vehicle odometer assembly 16, which is an accumulating type of mechanical register or totallizer counter device displaying in decimal digital read out form the mileage accumulated by the vehicle. The form of odometer illustrated has an accumulating capacity of 99,999.9 miles displayed on a cylindrical roll comprised of a plurality of relatively movable, axially aligned wheels 42–47 inclusive. Each of the wheels carries a series of indicia in the form of consecutive decimal numerals "0" to "9" evenly spaced and distributed about the external peripheral surface of the circumferentially extending rim thereof.

The wheels are formed of a molded plastic material as Cycolac and are received on an odometer shaft 50 on which is also supported a plurality of thin separator or partition plates 52–56, inclusive, formed of thin plastic material as Nylatron. The separator plates are located between adjacent wheels and support the transfer mechanism by means of which successive wheels are rotatably indexed and variably rotatably driven from the next lower ordered wheel, as shown and described in U.S. Pat. No. 3,408,003. The lowest ordered or tenths of miles wheel 42 is driven through an engaging hub element 58 from a stamped gear 60 secured to the odometer shaft which is rotatably supported on the bridge plate 14. The stamped gear 60 is driven from a generally vertically disposed cross-gear number 62 and mating worm and worm gear wheel elements associated with and driven from the speedometer input shaft, all as shown in the aforementioned application Ser. No. 638,805.

To the above described existing speedometer-odometer assembly, there is added the tamper-proving construction of the present invention comprising a marking instrument 70 which is periodically activated or actuated into marking engagement with the peripheral surface of at least the highest order odometer wheel 47. The marking instrument, which is positioned to one side of the viewing window 36 and in a relatively inaccessible location behind the speedometer dial 18, is formed of a slotted strip of material having a flat mounting portion 72 and a resilient or deflectable finger portion 74 which overhangs the rim of the wheel 47 as shown in FIG. 1. The flat mounting portion 72 is shown detachably fastened as by screw 76 to the bridge plate 14 and is separated from the finger portion 74 by the slot 78 except at the lower end of the finger which is integral with the mounting portion whereby the finger is thus deflectable relative to the porion 72. The strip is formed of a flat strip of resilient, yieldable material as Phosphor bronze although consideration may be given to plastic material, such as that of which the odometer separator plates are formed, that would be readily deflectable but would resist, as by fracturing, any effort to bend, deform, displace or remove the finger permanently from engagement with the wheel.

The central section of the finger 74 is formed as shown in FIG. 2 with an abutment 80, which is disposed in the path of and cooperates with an eccentric cam element 82 fastened to and driven by the odometer shaft 50. The eccentric cam 82 takes the place of the locking member 16 of the odometer of the aforementioned Pat. No. 3,408,-003. In addition to holding the odometer wheels on the odometer shaft, the element 82 also serves to displace the marking arm or finger portion 74 from engagement with the wheel 47 during a portion of the rotational cycle of revolution of the odometer shaft in order to relieve the braking or drag effect of the arm on the odometer rolls or wheels, as later explained.

The upper end of the finger 74, which is thus resiliently biased against the peripheral circumferential surface of the wheel 47, carries a marking element or applicator pad 75 composed of or impregnated with a material or substance that will indelibly mark or otherwise alter or affect the surface of the wheel as it is advanced past the marker arm. As carried out therein, the applicator pad is composed of an absorbent bibulous material such as felt saturated with a non-drying ink composed of a relatively non-volatile, non-creeping, oil based carrier and a pigmented dye that will react with the material composition of the wheel or that of the indicia bearing surface thereof to permanently discolor or stain the contacted surface thereof.

As shown in the drawings, the finger 74 contacts the portion of the wheel in the sector of the wheel between the location of the numerals "9" and "0" thereon in the initial position or setting of the roll in which the numeral "0" is presented in the viewing window. Accordingly, the wheel will be progressively marked over a portion of its surface corresponding to the extent of advancement of the wheel and as successively increasing numerical indicia thereon are presented in the viewing window. Thus, the marked portion of the wheel will not prematurely appear in the viewing window unless the setting of the wheel has subsequently been changed from an advanced position of the wheel to one which the wheel has previously occupied. It will be appreciated that, except for the stained portion of the wheel presented in the window, the reset position of the wheel cannot be readily related to external factors and the condition of the vehicle to establish the credibility of the mileage then indicated on the odometer.

Thus, if the vehicle has actually accumulated 45,000 miles thereon, and the odometer were subsequently reset to say, 31,000 miles, as by forward or reverse driving, picking or otherwise resetting of the odometer wheels, the numeral "3" on the higher order odometer wheel would appear stained in the viewing window to indicate proof of tampering.

The aforementioned camming element 82 serves to remove the staining finger 74 periodically from the odometer roll or once every mile to prevent adhering of the finger to the roll and enables the rolls to seek their free position. Otherwise, the unrelieved braking or drag effect of the described marker instrumentality on the rolls tends to produce an objectionable misaligned or skew presentation of the numerals displayed in the window. The described construction thus presents no interference with the operation of the odometer nor with the display provided therefrom, while providing a simple and effective form of tamper-proving construction compatible with existing forms of odometer designs.

What is claimed is:

1. A tamper-proving construction for an accumulating register device having a plurality of relatively movable register elements variably movably mounted and drivable relative to one another including means for driving the device in accordance with the condition being accumulated on the register elements each of which represents a different accumulating order of said device and contains a like series of indicia thereon, comprising the combination with said device of a marker instrumentality periodically activated during operation of the register device to mark the highest ordered one of said register elements as it is advanced past the marker instrumentality from an initially set position of that register element, whereby subsequent resetting of that element from its advanced position to a position previously occupied thereby will be indicated by the marked portion of the element.

2. The invention in accordance with claim 1 in which the marker instrumentality is periodically movable out of marking engagement with the highest ordered one of said register elments to relieve any drag or braking effect of the marker thereon.

3. The invention in accordance with claim 1 in which the marker instrumentality is periodically actuated into and out of marking engagement with the highest ordered one of said register elements by the said means driving the register device.

4. The invention in accordance with claim 1 in which the register device is an odometer having a plurality of aligned odometer wheels variably rotatably mounted on and driven from an odometer shaft that is coupled to and driven from the means for driving the odometer device, the marker instrumentality includes a marking element indelibly marking the surface of the highest order odometer wheel as it is driven past the marking element, and the odometer shaft carries a camming element thereon periodically engaging the marking instrument with rotation of the odometer shaft to displace the marking element from engagement with the odometer wheel.

5. The invention in accordance with claim 4 wherein the camming element of the odometer shaft also serves to retain the odometer wheels in assembled relation on the odometer shaft.

6. The invention in accordance with claim 4 in which odometer includes a plate located forwardly of the odometer and having a viewing window therein in which a portion of the indicia bearing surface of each odometer wheel is presented in an axially aligned display and in which the marker instrumentality is positioned in a relatively inaccessible location behind the plate and out of sight of the viewing window therein.

7. The invention in accordance with claim 1 wherein the marker instrumentality carries a marking substance reacting with the surface of the register element being marked to stain the portion of the surface of the register element marked thereby.

8. The invention in accordance with claim 7 wherein th marking substance is a non-drying ink composed of a non-volatile carrier and a pigmented dye.

9. The invention in accordance with claim 6 in which the marker instrumentality carrier a marking substance reacting with the surface of the odometer wheel being marked to stain the wheel as it is advanced past the marker instrumentality.

10. The invention in accordance with claim 9 wherein the marker instrumentality carries an absorbent marking pad saturated with a non-drying ink composed of a non-volatile oil based carrier and a pigmented dye.

References Cited

UNITED STATES PATENTS

| | | | |
|---|---|---|---|
| 1,531,774 | 3/1925 | Whittington | 116—114 |
| 1,610,639 | 12/1926 | Whittington | 116—114 |
| 3,137,444 | 6/1964 | Harada | 235—95 X |
| 3,482,773 | 12/1969 | Hachtel | 235—95 |
| 3,495,773 | 2/1970 | Hachtel | 235—96 |

RICHARD B. WILKINSON, Primary Examiner

S. A. WAL, Assistant Examiner

U.S. Cl. X.R.

116—114